(12) United States Patent
Lee (10) Patent No.: US 11,820,421 B2
(45) Date of Patent: Nov. 21, 2023

(54) STEERING ANGLE LIMITING DEVICE AND STEERING APPARATUS INCLUDING THE SAME

(71) Applicant: HL MANDO CORPORATION, Gyeonggi-do (KR)

(72) Inventor: Jungyu Lee, Seoul (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/871,859

(22) Filed: Jul. 22, 2022

(65) Prior Publication Data
US 2023/0311971 A1 Oct. 5, 2023

(30) Foreign Application Priority Data
Mar. 30, 2022 (KR) .................. 10-2022-0039348

(51) Int. Cl.
*B62D 5/04* (2006.01)
*B62D 1/16* (2006.01)

(52) U.S. Cl.
CPC .............. *B62D 1/16* (2013.01); *B62D 5/0469* (2013.01)

(58) Field of Classification Search
CPC .... B62D 5/0457; B62D 1/163; B62D 5/0469; B62D 1/16
See application file for complete search history.

(56) References Cited

U.S. PATENT DOCUMENTS 1,480,656 A * 1/1924 Blackburn ............... B62D 1/16
439/15
3,202,008 A * 8/1965 Geyer ................. F16H 25/2015
74/89.37
8,281,687 B2 * 10/2012 Koma ................ B62D 15/0215
74/575
8,668,226 B2 * 3/2014 Hirose ...................... F16C 1/10
74/494
11,161,541 B2 * 11/2021 Hwang ................... B62D 6/008
2013/0199867 A1 * 8/2013 Hirose ..................... B62D 1/16
180/444
2019/0389503 A1 * 12/2019 Hwang .................. B62D 5/001
2022/0281510 A1 * 9/2022 Reiter ...................... B62D 1/16
(Continued)

FOREIGN PATENT DOCUMENTS

| CN | 108639145 A | * 10/2018 | ............... B62D 1/16 |
| CN | 109094638 A | * 12/2018 | ............... B62D 1/16 |
| DE | 10051187 A1 | * 1/2002 | ............. B62D 5/005 |

(Continued)

OTHER PUBLICATIONS

DE 102017209664 A1 machine translation Feb. (Year: 2023).*

*Primary Examiner* — Paul N Dickson
*Assistant Examiner* — Maxwell L Meshaka
(74) *Attorney, Agent, or Firm* — Ladas & Parry, LLP (57) ABSTRACT

The present disclosure provides a steering angle limiting device including a bracket 41 fixed to a column housing 30 surrounding a steering shaft 10, a wire 42 having one end fixed to the bracket 41, and a wire stopper 43 fixed to the other end of the wire 42, wherein the wire stopper 43 is fixed to the other end of the wire 42 in a state where the wire 42 passes through a wire hole 10a formed to pass through the steering shaft 10 in a direction inclined to an axial direction of the steering shaft 10, and a steering apparatus including the same.

20 Claims, 12 Drawing Sheets

(56) References Cited

U.S. PATENT DOCUMENTS

2022/0281511 A1\* 9/2022 Galehr ................... B62D 5/001
2022/0315095 A1\* 10/2022 Heo ....................... B62D 5/001

FOREIGN PATENT DOCUMENTS

| DE | 102017209664 A1 | \* | 12/2018 | ............... B62D 1/16 |
| DE | 102019218515 A1 | \* | 6/2021 | |
| JP | 2002225729 A | \* | 8/2002 | ............ B62D 1/163 |
| KR | 101687373 B1 | \* | 12/2016 | |
| KR | 10-2019-0143575 | | 12/2019 | |
| WO | WO-2021032530 A1 | \* | 2/2021 | ............... B62D 1/16 |
| WO | WO-2022175278 A1 | \* | 8/2022 | |

\* cited by examiner

STEERING ANGLE LIMITING DEVICE AND STEERING APPARATUS INCLUDING THE SAME

CROSS-REFERENCE TO RELATED APPLICATIONS

This application claims benefit and priority to Korean Patent Application No. 10-2022-0039348, filed on Mar. 30, 2022, with the Korean Intellectual Property Office, the disclosure of which is incorporated herein in its entirety by reference.

BACKGROUND

1. Field of the Invention

One or more example embodiments relate to a steering angle limiting device and a steering apparatus including the same in a vehicle steering system, and more particularly, to a steering angle limiting device having a mechanical stopper in a steer-by-wire (SbW) steering system of a vehicle and a steering apparatus including the same.

2. Description of the Related Art

In general, a steering system for a vehicle is a device provided in a vehicle for a driver to turn the vehicle in a desired direction by manipulating a steering wheel provided in a driver's seat.

In recent years, an electric power steering (hereinafter referred to as 'EPS') device that provides a steering force required by a steering motor by electronic control has been widely used.

The EPS device operates to rotate the steering column or move the rack bar connected thereto by driving the EPS steering motor according to a steering torque applied to the steering wheel by the driver.

To this end, the EPS device includes an EPS steering motor and a steering ECU (electronic control unit) for controlling the steering motor, in which a reducer is connected to the steering motor, and the reducer operates in conjunction with a steering column or a rack bar.

Meanwhile, in the flow of vehicles changing from means of transportation to mobility space, the SbW system, which meets the demand for common parts with a free layout, and can be applied to various vehicle platforms such as skateboards, is of interest as a future steering apparatus.

The SbW system is an electric signal type intelligent steering system that transmits and controls the driver's will to steer with an electric signal without a mechanical connection between the driver's steering wheel and vehicle wheels. In other words, the SbW steering system removes a mechanical connection device such as a steering column, a universal joint, or a pinion shaft between the steering wheel and the vehicle wheel, and instead uses an electric motor such as a motor to steer the vehicle.

SbW includes a road wheel actuator (RWA) which is an actuator that moves the vehicle wheels by transmitting the driver's steering intention to the wheels, and a steering feedback actuator (SFA) which is an actuator that provides reaction force of the steering wheel to the driver. SFA is also referred to as steering reaction force device.

More specifically, the SbW system generally includes an upper stage device (referred to as SFA), a lower stage device, and a control device for controlling them.

The upper stage device (SFA) includes a torque sensor connected to the steering wheel to sense a torque applied to the steering wheel, and a reaction force motor as a motor device for providing a reaction torque to the steering wheel according to steering through the lower rack bar.

The lower stage device generates a steering auxiliary torque signal proportional to the steering torque applied to the steering wheel, and controls a steering drive motor or a steering drive actuator (RWA) that drives a pinion gear or a ball nut mechanism for moving the rack bar connected to a tie rod of the vehicle wheel left and right by using the steering auxiliary torque signal.

In addition, in an SbW steering system according to a related art, a method of limiting the rotation angle of the steering shaft, i.e., the steering angle, by a mechanical end stop is known.

Figure 1:
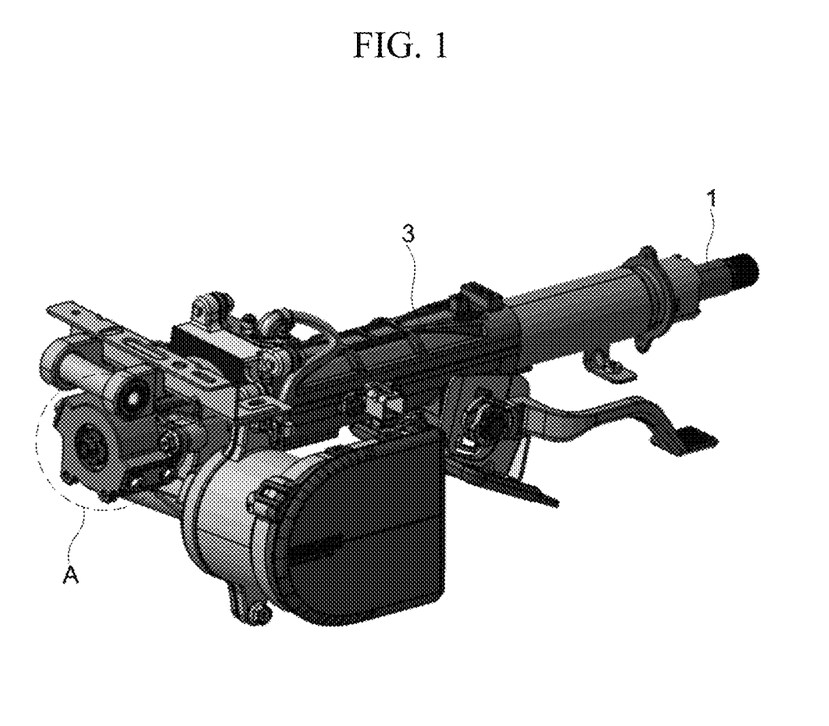
FIG. 1 is a diagram schematically illustrating a conventional SbW steering system.

A steering angle limiting device of an SbW steering system according to a related art is illustrated in FIGS. 1 to 4. FIG. 1 schematically illustrates an SbW steering system according to the related art including a steering shaft 1 and a column housing 3, and part 'A' shows a device for limiting the steering angle with the mechanical end stop.

Figure 2:
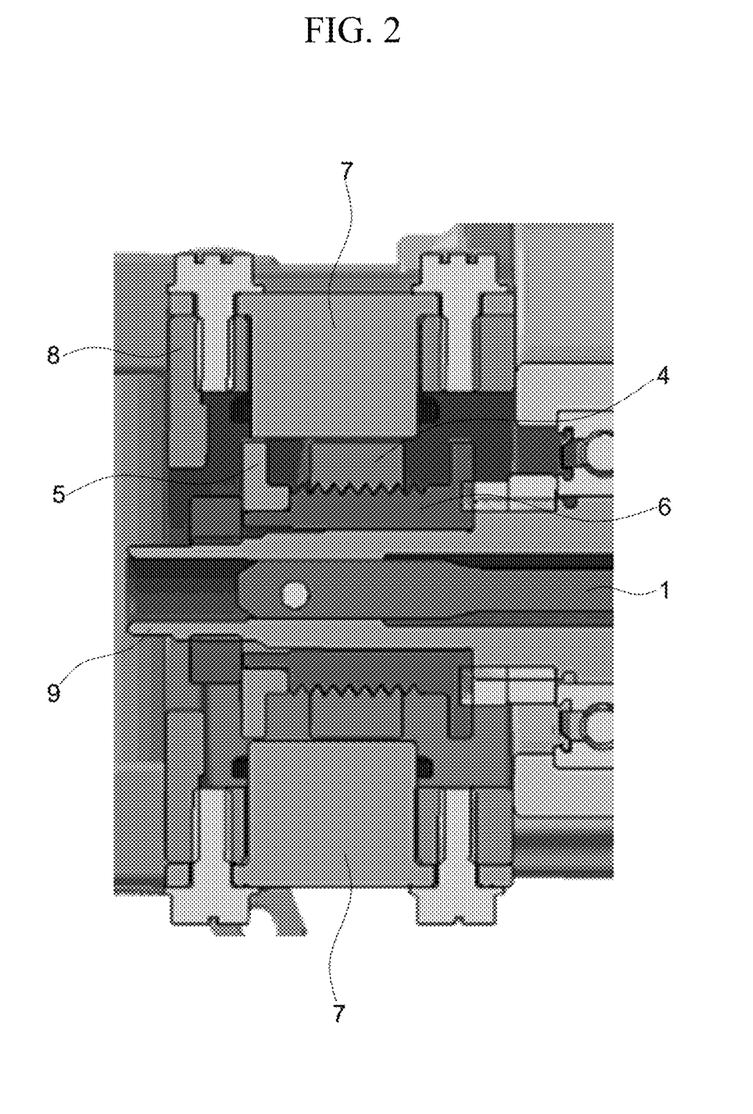
FIG. 2 is a longitudinal section view of a steering angle limiting device according to a related art.
Figure 3:
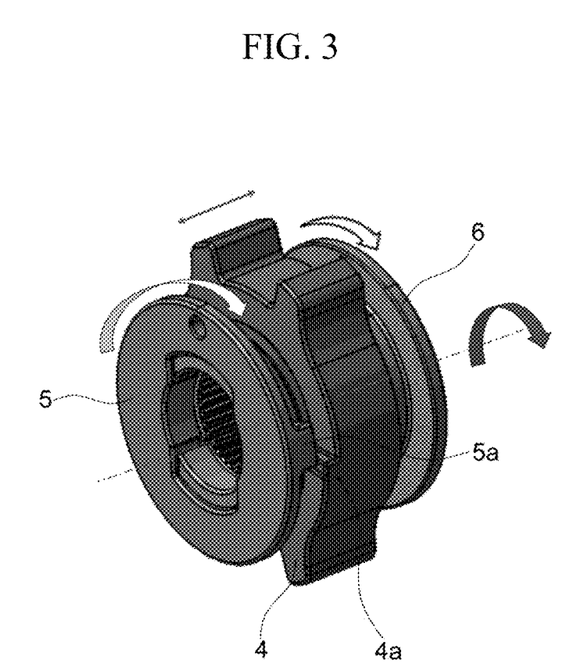
FIGS. 3 and 4 are diagrams illustrating main components of a steering angle limiting device according to a related art.
Figure 4:
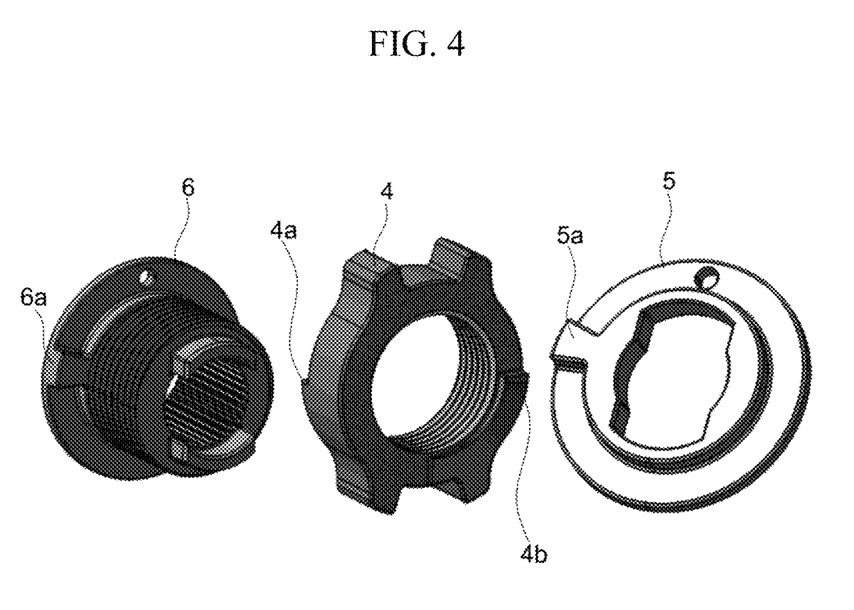

FIG. 2 is a longitudinal cross-sectional view of a steering angle limiting device according to the related art, and FIGS. 3 and 4 illustrate a first fixed cam 5 for limiting the rotation of the steering shaft 1, a second fixed cam 6, and an SFA nut screwed with the second fixed cam 6. When the first fixed cam 5 and the second fixed cam 6 fixed to the output shaft 9 of the SFA column rotate, the SFA nut 4, whose rotational direction movement is restricted by the stopper guide 7 fixed to the stopper housing 8, makes translational motion in the axial direction, and meets between the stopper protrusions at both ends to prevent further rotation. Referring to FIGS. 3 and 4, when the SFA nut 4 screwed with the second fixed cam 6 moves in the axial direction and arrives at the end as the first fixed cam 5 and the second fixed cam 6 rotate together with the output shaft 9, the nut protrusion 4a or 4b comes into contact with a second protrusion 6a of the second fixed cam 6 or a first protrusion 5a of the first fixed cam 5 to stop the rotation of the output shaft 9, i.e., the rotation of the steering shaft 1.

In the steering angle limiting device according to the related art, the stopper protrusions (4a and 6a or 4b and 5a) have to contact each other and hang at the ends during operation. However, there is an issue that depending on the degree of thread processing, sometimes the stopper protrusions do not come into contact with each other and a slip phenomenon occurs that the stopper protrusion climbs up the flat surface above, and thus they may not play the role of a stopper. In this case, more rotation than intended may occur.

Further, when the main shaft rotates, the first fixed cam 5 and the second fixed cam 6 should be able to rotate at all times along the screw thread, but there is an issue in that unintended friction and jamming may occur due to interference between rotations depending on the degree of the screw thread.

Furthermore, the steering angle limiting device according to the related art has an issue that the number of parts required for the stopper function is too large and it is not easy to assemble each unit directly on the column shaft side.

PRIOR ART DOCUMENT

Patent Document (Patent Document 1) Korean Patent Application Publication No. 10-2019-0143575 (Published on Dec. 31, 2019)

SUMMARY

Example embodiments have been made in an effort to solve the above issues, and provide a steering angle limiting device excellent in performance, assembling property, and cost in an SbW steering system and a steering apparatus including the same.

According to an example embodiment, there is provided a steering angle limiting device including a bracket fixed to a column housing surrounding a steering shaft, a wire having one end fixed to the bracket, and a wire stopper fixed to the other end of the wire, wherein the wire stopper is fixed to the other end of the wire in a state where the wire passes through a wire hole formed to pass through the steering shaft in a direction inclined to an axial direction of the steering shaft.

Further, the wire stopper may be formed to have a length longer than a size of the wire hole.

Further, as the steering shaft is rotated in one rotational direction, the wire may wind around the steering shaft while being moved through the wire hole.

Further, when the wire stopper is caught on the steering shaft and the wire is no longer moved, the rotation of the steering shaft in one rotational direction may stop.

Further, as the steering shaft is rotated in an opposite rotational direction to the one rotational direction, the wire wound by the rotation in the one rotational direction may unwind.

Further, as the steering shaft continues to rotate in the opposite rotational direction, the wire may wind in an opposite direction around the steering shaft.

Further, when the wire stopper is caught on the steering shaft and the wire is no longer moved, the rotation of the steering shaft in the opposite rotational direction may stop.

Further, the bracket may be fixed to a bracket fixing portion located outside of the column housing.

Further, a tab may be formed in the bracket fixing portion, a bracket hole may formed in the bracket, and the bracket may be screwed to the bracket fixing portion by a bolt passing through the bracket hole and the tab.

Further, one end of the wire may be fixed by welding to one surface of the bracket.

According to an example embodiment, there is provided a steering apparatus including a steering shaft, a column housing surrounding the steering shaft, a bracket fixed to the column housing, a wire having one end fixed to the bracket, and a wire stopper fixed to the other end of the wire, wherein the wire stopper is fixed to the other end of the wire in a state where the wire passes through a wire hole formed to pass through the steering shaft in a direction inclined to an axial direction of the steering shaft.

According to a steering angle limiting device and a steering apparatus of example embodiments as configured above, it is possible to easily limit a steering angle desired by a user by adjusting the length of a wire.

Further, since the steering angle limiting device of example embodiments does not use a screw rotation method, the friction issue is very small, and since the impact noise of the steering shaft and the stopper at the end of the wire is not large, it has an excellent effect in terms of friction and noise and vibration (NVH) compared to the screw rotation type steering angle limiting device according to a related art.

Further, since the steering angle limiting device of example embodiments enable to set the maximum rotation angle by simply adjusting the length of the wire, it is possible to easily manufacture and install, as well as to easily maintain.

Further, since the steering angle limiting device of example embodiments has a very simple structure compared to the steering angle limiting device according to a related art due to the small number of components, it is possible to easily install at any position on the steering axis, making the package configuration free and the cost advantageous.

DETAILED DESCRIPTION

Hereinafter, a steering angle limiting device according to example embodiments will be described in detail with reference to FIGS. 5 to 12.

Figure 5:
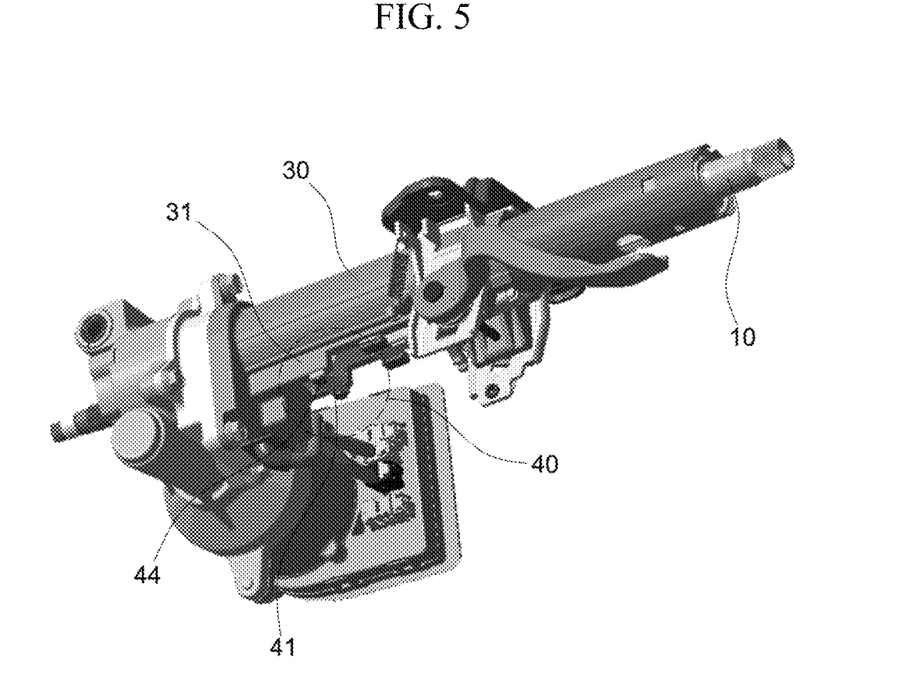
FIG. 5 is a diagram schematically illustrating an SbW steering system including a steering angle limiting device according to an example embodiment.

FIG. 5 schematically illustrates an SbW steering system including a steering angle limiting device according to an example embodiment. A steering shaft 10 coupled to a steering wheel (not shown) rotates together with the steering wheel, and a bracket 41 constituting a steering angle limiting device 40 is fixed to a column housing 30 surrounding the steering shaft 10.

Figure 6:
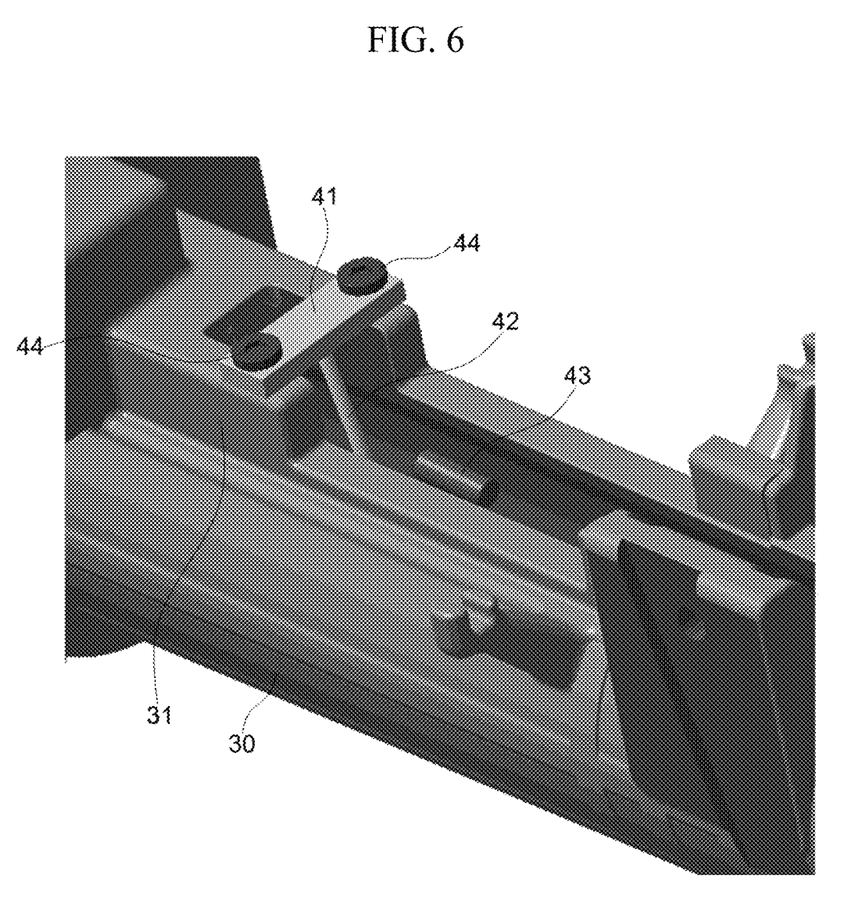
FIGS. 6 and 7 are perspective views illustrating a state in which a steering angle limiting device according to an example embodiment is mounted.
Figure 7:
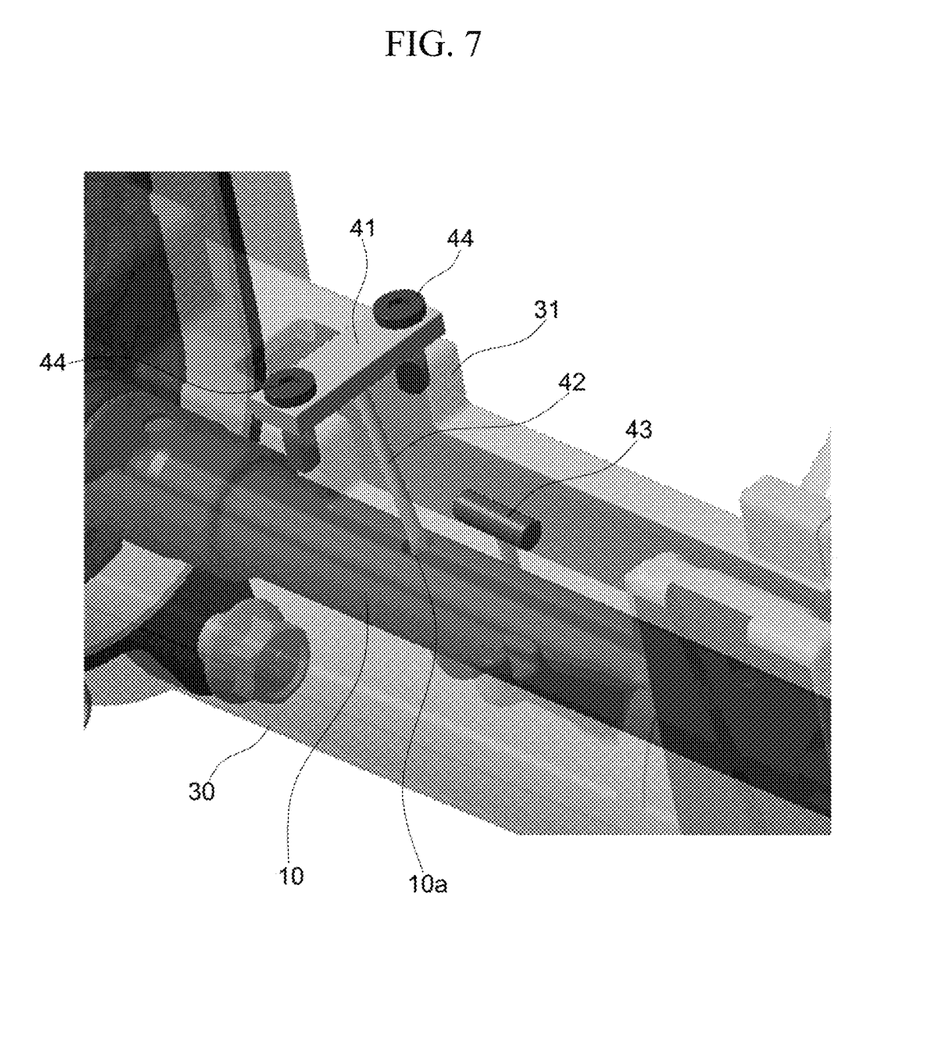
Figure 8:
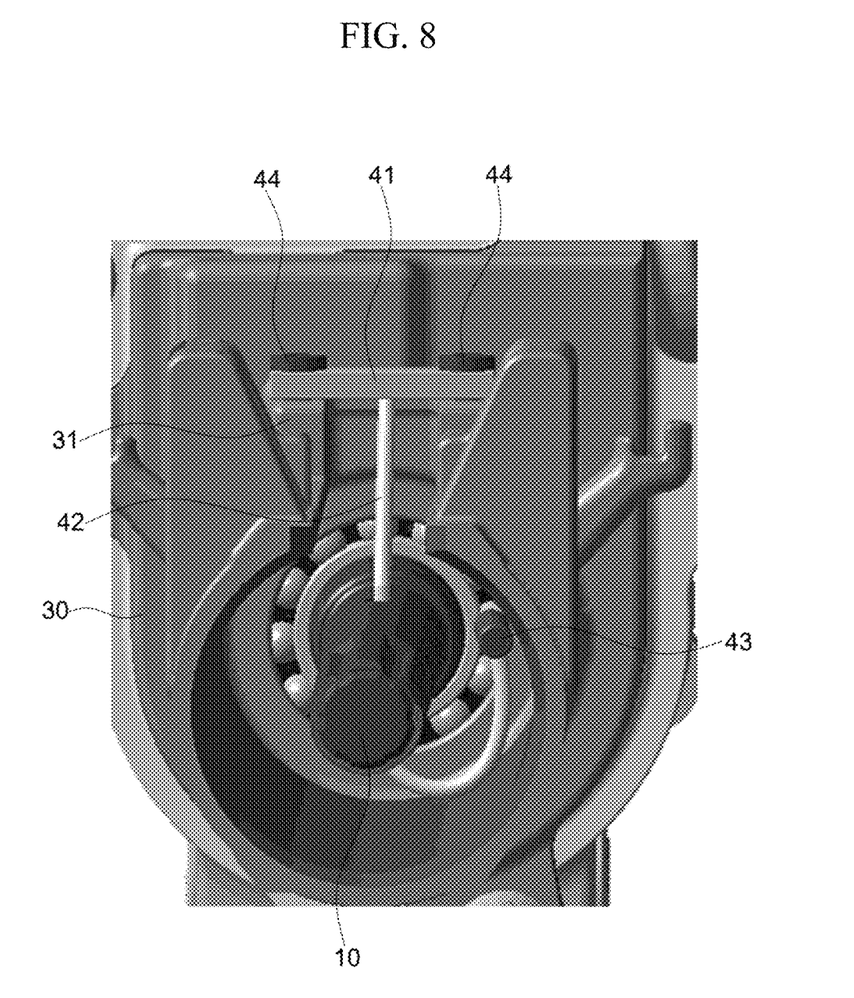
FIG. 8 is a side cross-sectional view showing the state of FIG. 6 viewed from the side.
Figure 9:
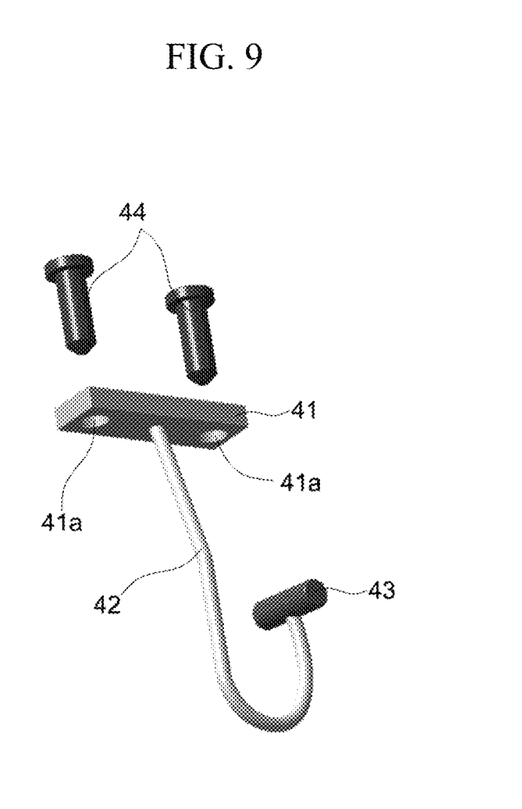
FIG. 9 is a diagram illustrating components of a steering angle limiting device according to an example embodiment.
Figure 10:
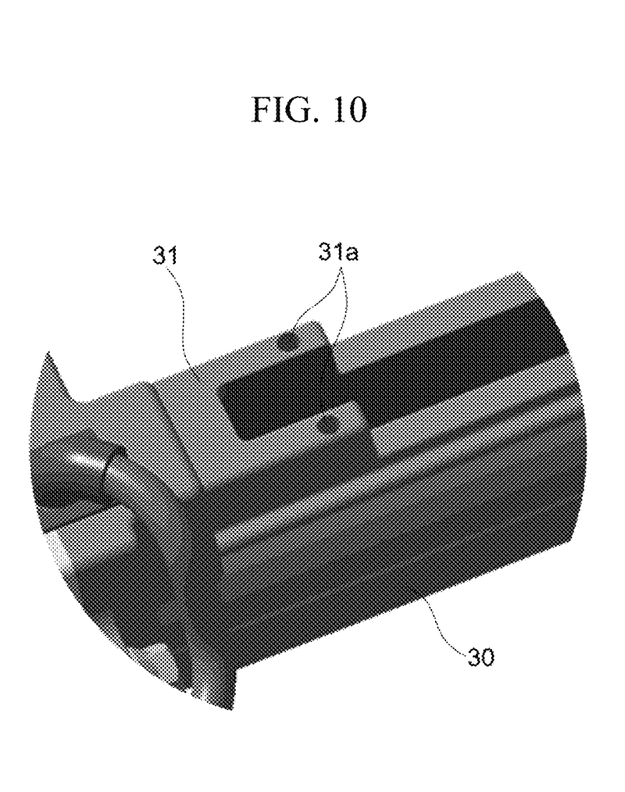
FIG. 10 is a diagram illustrating a column housing to which a steering angle limiting device according to example embodiments is fixed.

FIGS. 6 and 7 are perspective views illustrating a state in which a steering angle limiting device according to an example embodiment is mounted, FIG. 8 is a side cross-sectional view showing the state of FIG. 6 viewed from the side, and FIG. 9 illustrates components of a steering angle limiting device.

Referring to FIG. 9, a steering angle limiting device 40 according to an example embodiment includes a bracket 41, a wire 42 having one end fixed to the bracket 41, and a wire stopper 43 fixed to the other end of the wire 42.

Referring to FIGS. 6 to 11, the bracket 41 of the steering angle limiting device 40 is fixed to a column housing 30 surrounding the steering shaft 10. More specifically, the bracket 41 may be fixed to a bracket fixing portion 31 located outside the column housing 30. A tab 31a may be formed in the bracket fixing portion 31 to enable screw coupling, and a bracket hole 41a may be formed in the bracket 41, so that the bracket 41 may be screwed to the bracket fixing portion 31 by a bolt 44 passing through the bracket hole 41a and the tab 31a.

The bracket 41 serves as a medium for one end of the wire 42 having one end fixed thereto to be fixed to the column housing 30 and is not limited in shape. For example, the bracket 41 may be formed in a flat plate shape. The wire 42 may be fixed to one surface of the bracket 41 by welding or other known coupling methods.

The wire 42 having one end fixed to the bracket 41 is wound on the outside of the steering shaft 10 as the steering shaft 10 is rotated, the wire 42 may be made of any material as long as it is flexible enough to be wound around the steering shaft 10. Preferably, the wire may be made of a steel cable having high strength and high flexibility.

The wire 42 may be formed of only one as illustrated in the drawings, but may be formed of two or more depending on required strength or design specifications.

Figure 11:
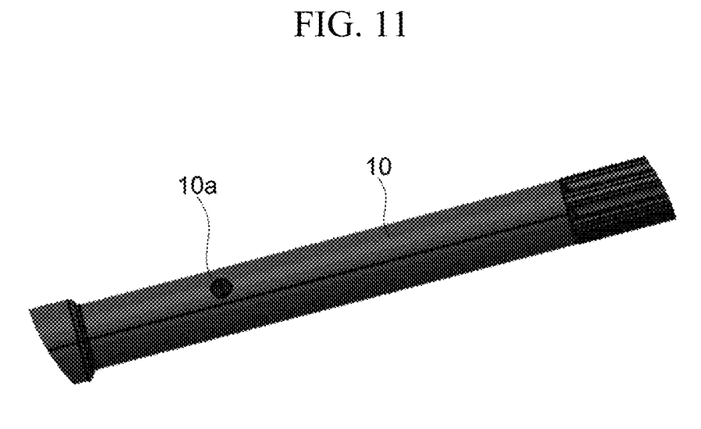
FIG. 11 is a diagram illustrating a steering shaft whose steering angle is adjusted by a steering angle limiting device according to example embodiments.

Referring to FIGS. 7 and 11, a wire hole 10a is formed in the steering shaft 10 in a direction inclined to an axial direction of the steering shaft 10. The wire hole 10a is to allow the wire 42 to pass therethrough, and may be formed to have an arbitrary inclination angle with respect to the axial direction, and may be exemplarily formed in a direction perpendicular to the axial direction.

Referring to FIGS. 7 to 9, a wire stopper 43 is fixed to the other end of the wire 42. The wire stopper 43 is to stop the movement at the end of the wire when the wire 42 moves through the wire hole 10a of the steering shaft 10. Therefore, the wire stopper 43 is formed in a shape that can stop the movement of the wire 42 at the end. As illustrated in the drawings, the wire stopper 42 may be formed in a long cylindrical shape and in this case, a length of a cylindrical stopper is formed to be longer than a size of the wire hole 10a.

When the wire stopper 42 is formed in a cylindrical shape, the diameter of the cylinder is formed smaller than the size of the wire hole 10a, so that it can be assembled by passing the wire hole 10a together with the wire 42.

The wire stopper 43 may be formed in a spherical shape or an egg shape having a size larger than that of the wire hole 10a.

Hereinafter, an operating method of the steering angle limiting device according to the present disclosure will be described with reference to FIG. 12.

One end of the wire 42 of the steering angle limiting device 40 is fixed to the column housing 30 which is always fixed regardless of the rotation of the steering shaft 10, and the other end of the wire 42 is dependent on the steering shaft 10.

Figure 12:
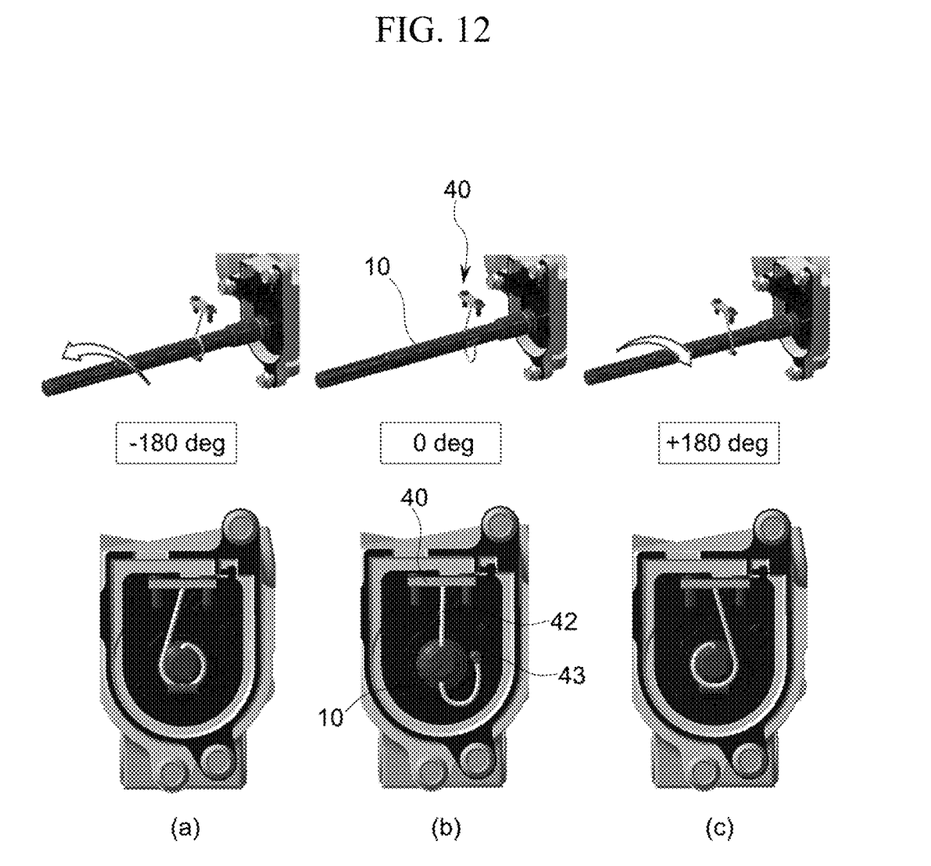
FIG. 12 is a diagram illustrating a steering angle being limited according to the operation of the steering angle limiting device according to example embodiments.

FIG. 12 (b) illustrates a state in which a steering shaft 10 is not rotated.

As the steering shaft 10 is rotated in one rotational direction as shown in FIG. 12 (a), the wire 42 winds around the steering shaft 10 while moved through the wire hole 10a. When the wire 42 winds around the steering shaft 10 and the steering shaft 10 is rotated to a maximum angle (−180 degrees in this example), the wire stopper 43 is caught on the steering shaft 10 and the wire 42 no longer winds around the steering shaft 10 and the rotation of the steering shaft 10 stops.

When the steering shaft 10 rotates in the opposite rotational direction as shown in FIG. 12 (c), the wire 42 wound as shown in FIG. 12 (a) unwinds, and as it continues to rotate in the opposite rotational direction of the steering shaft 10, the wire 42 winds in the opposite direction around the steering shaft 10. When the steering shaft 10 is rotated to a maximum angle (180 degrees in this example) in the opposite rotational direction as shown in FIG. 12 (c), the wire stopper 43 is caught on the steering shaft 10, and accordingly, the wire 42 no longer winds around the steering shaft 10 and rotation of the steering shaft 10 stops.

The wire 42 may be made of a steel material to satisfy required strength. In addition, flexibility may be secured by using a bundled wire woven with thin wires.

Since the steering angle limiting device according to example embodiments described above does not use a screw rotation method, friction issues are very rare, and since the impact noise of the steering shaft and the stopper at the end of the wire is not large, the performance in terms of friction and NVH compared to the screw rotation type steering angle limiting device according to the related art is superior.

In addition, according to the steering angle limiting device of example embodiments, since it is possible to set the maximum rotation angle by simply adjusting the length of the wire, manufacturing and installation are very easy as well as maintenance.

In addition, since the steering angle limiting device of example embodiments has a very simple structure compared to the steering angle limiting device according to the related art due to the small number of components, it is possible to easily install at any position on the steering axis, making the package configuration free and the cost advantageous.

The above description is merely illustrative of the technical spirit of the present disclosure, and various modifications and variations would be possible without departing from the essential characteristics of the present disclosure by those skilled in the art to which the present disclosure pertains. Therefore, the example embodiments disclosed in the present disclosure are intended to explain the technical idea of the invention, not to limit it, and the scope of the technical idea is not limited by these example embodiments. The protection scope of the disclosure should be construed by the appended claims, and all technical ideas within the scope equivalent thereto should be construed as being included in the scope of the present disclosure.

EXPLANATION OF REFERENCE NUMERALS 1, 10: Steering shaft
3, 30: Column housing
4: SFA nut
4a, 4b: Nut protrusion
5: First fixed cam
5a: First protrusion
6: Second fixed cam
6a: Second protrusion
7: Stopper guide
8: Stopper housing
9: Output shaft
10a: Wire hole
31: Bracket fixing portion
31a: Tab
40: Steering angle limiting device
41: Bracket
41a: Bracket hole
42: Wire
43: Wire stopper
44: Bolt

What is claimed is:

1. A steering angle limiting device comprising:
   a bracket fixed to a column housing surrounding a steering shaft;
   a wire having one end fixed to the bracket; and
   a wire stopper fixed to the other end of the wire, wherein the wire passes through a wire hole formed in the steering shaft from one opening formed at an outer surface of the steering shaft to another opening formed at the outer surface of the steering shaft.

2. The steering angle limiting device of claim 1, wherein the wire stopper is formed to have a length longer than a size of the wire hole.

3. The steering angle limiting device of claim 1, wherein the wire is configured to, as the steering shaft is rotated in one rotational direction, wire around the steering shaft while being moved through the wire hole.

4. The steering angle limiting device of claim 3, wherein, when the wire stopper is caught on the steering shaft and the wire is no longer moved, the rotation of the steering shaft in the one rotational direction stops.

5. The steering angle limiting device of claim 4, wherein, as the steering shaft is rotated in an opposite rotational direction to the one rotational direction, the wire wound by the rotation in the one rotational direction unwinds.

6. The steering angle limiting device of claim 5, wherein, as the steering shaft continues to rotate in the opposite rotational direction, the wire winds in an opposite direction around the steering shaft.

7. The steering angle limiting device of claim 6, wherein, when the wire stopper is caught on the steering shaft and the wire is no longer moved, the rotation of the steering shaft in the opposite rotational direction stops.

8. The steering angle limiting device of claim 2, wherein the bracket is fixed to a bracket fixing portion located outside of the column housing.

9. The steering angle limiting device of claim 8, wherein a tab is formed in the bracket fixing portion, and a bracket hole is formed in the bracket, and
   the bracket is screwed to the bracket fixing portion by a bolt passing through the bracket hole and the tab.

10. The steering angle limiting device of claim 9, wherein one end of the wire is fixed by welding to one surface of the bracket.

11. A steering apparatus comprising:
    a steering shaft;
    a column housing surrounding the steering shaft;
    a bracket fixed to the column housing;
    a wire having one end fixed to the bracket; and
    a wire stopper fixed to the other end of the wire, wherein the wire passes through a wire hole formed in the steering shaft from one opening formed at an outer surface of the steering shaft to another opening formed at the outer surface of the steering shaft.

12. The steering apparatus of claim 11, wherein the wire stopper is formed to have a length longer than a size of the wire hole.

13. The steering apparatus of claim 11, wherein, the wire is configured to, as the steering shaft is rotated in one rotational direction, wind around the steering shaft while being moved through the wire hole 10a.

14. The steering apparatus of claim 13, wherein, when the wire stopper is caught on the steering shaft and the wire is no longer moved, the rotation of the steering shaft in the one rotational direction stops.

15. The steering apparatus of claim 14, wherein, as the steering shaft is rotated in an opposite rotational direction to the one rotational direction, the wire wound by the rotation in the one rotational direction unwinds.

16. The steering apparatus of claim 15, wherein, as the steering shaft continues to rotate in the opposite rotational direction, the wire unwinds and then winds in an opposite direction around the steering shaft.

17. The steering apparatus of claim 16, wherein, when the wire stopper is caught on the steering shaft and the wire is no longer moved, the rotation of the steering shaft in the opposite rotational direction stops.

18. The steering apparatus of claim 12, wherein the bracket is fixed to a bracket fixing portion located outside of the column housing.

19. The steering apparatus of claim 18, wherein a tab is formed in the bracket fixing portion, a bracket hole is formed in the bracket, and
    the bracket is screwed to the bracket fixing portion by a bolt passing through the bracket hole and the tab.

20. The steering apparatus of claim 19, wherein one end of the wire is fixed by welding to one surface of the bracket.

\* \* \* \* \*